United States Patent
Leichter et al.

(10) Patent No.: US 10,761,288 B2
(45) Date of Patent: Sep. 1, 2020

(54) ARMORED FIBER OPTIC CABLE CONNECTOR ASSEMBLY

(71) Applicant: OFS Fitel, LLC, Norcross, GA (US)

(72) Inventors: Eric J Leichter, Buford, GA (US); Denis E Burek, Cumming, GA (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 16/701,213

(22) Filed: Dec. 3, 2019

(65) Prior Publication Data

US 2020/0209502 A1    Jul. 2, 2020

Related U.S. Application Data

(60) Provisional application No. 62/775,993, filed on Dec. 6, 2018.

(51) Int. Cl.
  *G02B 6/44* (2006.01)
  *G02B 6/38* (2006.01)

(52) U.S. Cl.
  CPC ........... *G02B 6/4471* (2013.01); *G02B 6/389* (2013.01); *G02B 6/3887* (2013.01); *G02B 6/3897* (2013.01)

(58) Field of Classification Search
  CPC .... G02B 6/2551; G02B 6/2558; G02B 6/387; G02B 6/3821; G02B 6/3823; G02B 6/3825; G02B 6/3831; G02B 6/3847; G02B 6/3849; G02B 6/3871; G02B 6/3881; G02B 6/3887; G02B 6/3889; G02B 6/389; G02B 6/3894; G02B 6/4459; G02B 6/4471

USPC .......................... 385/53, 107, 108, 134–139
See application file for complete search history.

(56) References Cited

U.S. PATENT DOCUMENTS

| | | | |
|---|---|---|---|
| 8,523,455 B2 | 9/2013 | Luther et al. | |
| 9,122,021 B2 | 9/2015 | Elenbaas et al. | |
| 9,971,101 B2 | 5/2018 | Bringuier et al. | |
| 2016/0209599 A1* | 7/2016 | Van Baelen | G02B 6/3871 |
| 2017/0343741 A1* | 11/2017 | Coenegracht | G02B 6/3821 |
| 2017/0357074 A1* | 12/2017 | Hill | G02B 6/3887 |

OTHER PUBLICATIONS

OFS Fitel, LLC, M-Pack Indoor/Outdoor MDU Drop Cable, Specification Sheet (2017).
OFS Fitel, LLC, Mini-LT Flat Drop Fiber Optic Cable, Specification Sheet (2017).
TE Connectivity Ltd., FullAXS Connector Sealing & Cable Assembly System Solution Guide (2018).

* cited by examiner

*Primary Examiner* — Michael P Mooney
(74) *Attorney, Agent, or Firm* — Leo Zucker, Esq.

(57) ABSTRACT

A fiber optic cable connecter assembly includes a terminal wall having a port, an adapter at the port having one end for mating with a first fiber optic cable at the front of the wall and a second end for mating with a second cable at the back, and a spacer having an axial bore and a leading portion for engaging the port in sealing relationship. A cap has an axial bore, and a leading portion for engaging a rear portion of the spacer. A cable grommet/boot has a passage for receiving the first cable, and a leading end for engaging the rear portion of the spacer in sealing relationship. The rear portion of the grommet/boot protrudes from the back of the cap to act as a boot when the cap engages the spacer, after the first cable is connected to the adapter and the spacer engages the port.

11 Claims, 6 Drawing Sheets

ARMORED FIBER OPTIC CABLE CONNECTOR ASSEMBLY

CROSS REFERENCE TO RELATED APPLICATION

This application claims priority under 35 U.S.C. § 119(e) of U.S. Provisional Patent Application No. 62/775,993 filed Dec. 6, 2018, titled Fiber Optic Connector/Splice Gland, and which is incorporated by reference in its entirety.

BACKGROUND OF THE INVENTION

Field of the Invention

The present invention relates generally to cable connectors, and particularly to armored or ruggedized connector assemblies for fiber optic cables outdoors.

Discussion of the Known Art

Fiber optic drop cables link customers with fiber networks that provide telephony, TV, Internet, and/or other data streams for customer use. The cables are often routed from fiber distribution terminals that are aerially supported outdoors, to an entrance terminal located on or inside the customer premises. Thus, the connectors provided on the cables and at the distribution terminals must be sufficiently armored or ruggedized to withstand the outdoor environment as well as specified loading forces. The required connectors are typically factory-installed on the cables and on the distribution terminals.

Armored or ruggedized fiber optic cable connectors are commercially available from Corning Optical Communications LLC, under the registered mark OptiTap. See, e.g., U.S. Pat. No. 9,971,101 (May 15, 2018) and U.S. Pat. No. 8,523,455 (Sep. 3, 2013), all relevant portions of which are incorporated by reference. If the connectors become damaged in the field, or when new service is desired by a customer, one or more new drop cables may need to be ordered with OptiTap style connectors pre-installed at the factory.

A cable and bulkhead connector sealing system is offered by TE Connectivity Nederland B.V. under the mark FullAXS (tm). See U.S. Pat. No. 9,122,021 (Sep. 1, 2015), all relevant portions of which are incorporated by reference. The system only provides a sleeve solution for standard fiber optic cable connectors, however.

Accordingly, there is a need for an armored or ruggedized fiber optic cable connector assembly for service drop and other outdoor cable installations, wherein the assembly can be implemented quickly in the field with few parts and at minimal cost. There is also a need for a fiber optic cable connecter assembly that enables existing fiber optic cables to be armored sufficiently to service users from aerial fiber distribution terminals or to be buried underground outdoors.

SUMMARY OF THE INVENTION

According to the invention, an armored fiber optic cable connecter assembly includes a terminal wall having a port for connecting a first fiber optic cable at a front side of the wall, with a second fiber optic cable at a back side of the wall, an elongated spacer having an axial through bore, a leading portion, and a rear portion; and a connector adapter.

The port on the terminal wall includes a collar on the front side of the wall, and the port is constructed to retain the connector adapter so that a first end of the adapter is disposed within the collar on the front side of the wall to connect with the first fiber optic cable, and a second end of the adapter is disposed at the back side of the wall to connect with the second fiber optic cable. The leading portion of the spacer is configured to engage the collar in sealing relationship at the front side of the wall.

The assembly also includes a generally cylindrical cap having an axial through bore that defines an opening in the back of the cap, wherein a leading portion of the cap engages the rear portion of the spacer in alignment with the bore in the spacer, and a cable grommet/boot having a leading end, a rear portion, and an axial through passage for receiving the first fiber optic cable for relative sliding movement. The leading end of the grommet/boot engages the rear portion of the spacer in sealing relationship, and the rear portion of grommet/boot protrudes from the opening in the back of the cap to act as a boot for the first fiber optic cable, when (i) the first fiber optic cable passes through the opening in the back of the cap, (ii) the cable is inserted through the passage in the grommet/boot and the rear portion of the grommet/boot is disposed with the cable the bore in the cap, and (iii) the cap engages the rear portion of the spacer after a leading end of the cable is connected to the first end of the adapter, and the leading portion of the spacer engages the collar on the front side of the terminal wall.

According to another aspect of the invention, an armored fiber optic cable connecter assembly for connecting first and second fiber optic cables to one another, includes an elongated housing having a through bore and opposite axial end portions, a connector adapter, and a pair of generally cylindrical caps each having an axial bore that defines an opening in a back end of the cap. A leading portion of each cap is configured to engage a corresponding end portion of the housing in axial alignment with the bore in the housing.

A pair of cable grommet/boots each has a leading end, a rear portion, and an axial through passage dimensioned to receive a corresponding one of the first and the second fiber optic cables for relative sliding movement. The leading end of each grommet/boot engages a corresponding axial end portion of the housing in sealing relationship, and the rear portion of each grommet/boot protrudes from an opening in the back of a corresponding cap to act as a boot for a corresponding one of the first and the second cables, when (i) the first and the second cables are passed through the openings in the back ends of corresponding caps, (ii) each cable is inserted in a corresponding grommet/boot and the rear portion of the grommet/boot together with the inserted cable is placed within the bore in a corresponding cap, and (iii) each cap engages a corresponding axial end portion of the housing after leading ends of the cables are connected through the adapter.

For a better understanding of the invention, reference is made to the following description taken in conjunction with the accompanying drawing and the appended claims.

BRIEF DESCRIPTION OF THE DRAWING FIGURES

DETAILED DESCRIPTION OF THE INVENTION

Figure 1:
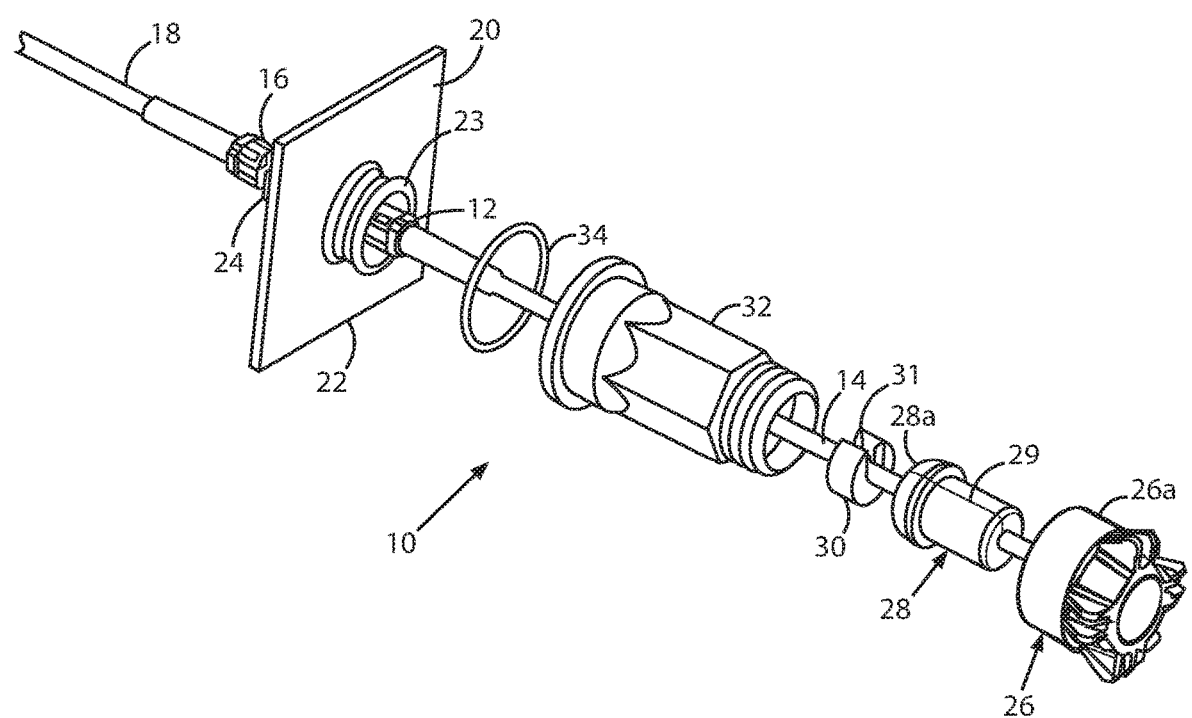
FIG. 1 is an exploded view of an armored connection between a port on a fiber distribution terminal and a fiber optic cable, according to the invention.
Figure 3:
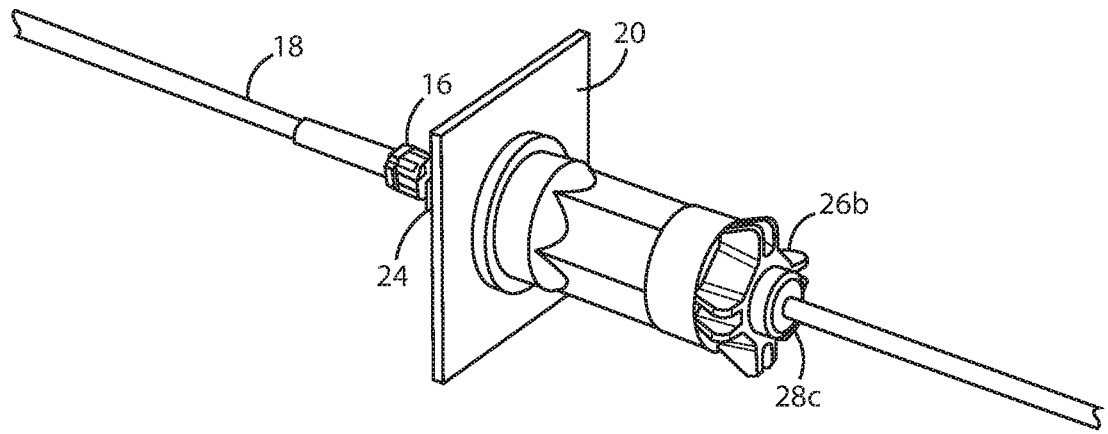
FIG. 3 is an isometric view of the armored connection in FIG. 1 in an assembled state.

FIG. 1 is an exploded view of a first embodiment of an armored fiber optic cable connecter assembly 10, according to the invention. The assembly 10 enables an SCA connector 12 at one end of a fiber optic drop cable 14 having an outer diameter (O.D.) of, e.g., 4.8 mm, to connect operatively with another SCA connector 16 at the end of another fiber optic cable 18 routed behind a distribution terminal wall 20. FIG. 3 shows the cable connecter assembly 10 when fully constructed.

The distribution terminal wall 20 has a port 22 that includes a collar 23 that is threaded on its outside circumference and which projects from the front of the wall 20 as seen in FIG. 1. The collar 23 can be made of, e.g., polypropylene and have an outer diameter (O.D.) of about 1.00 inch.

Figure 2:
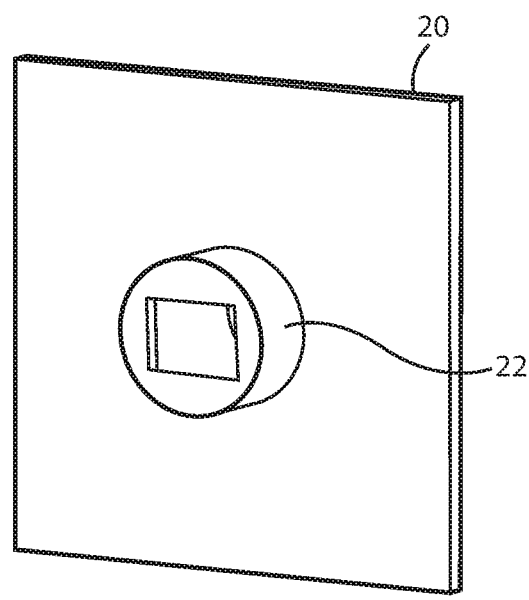
FIG. 2 is an isometric view of a rear side of the terminal wall in FIG. 1.
Figure 4:
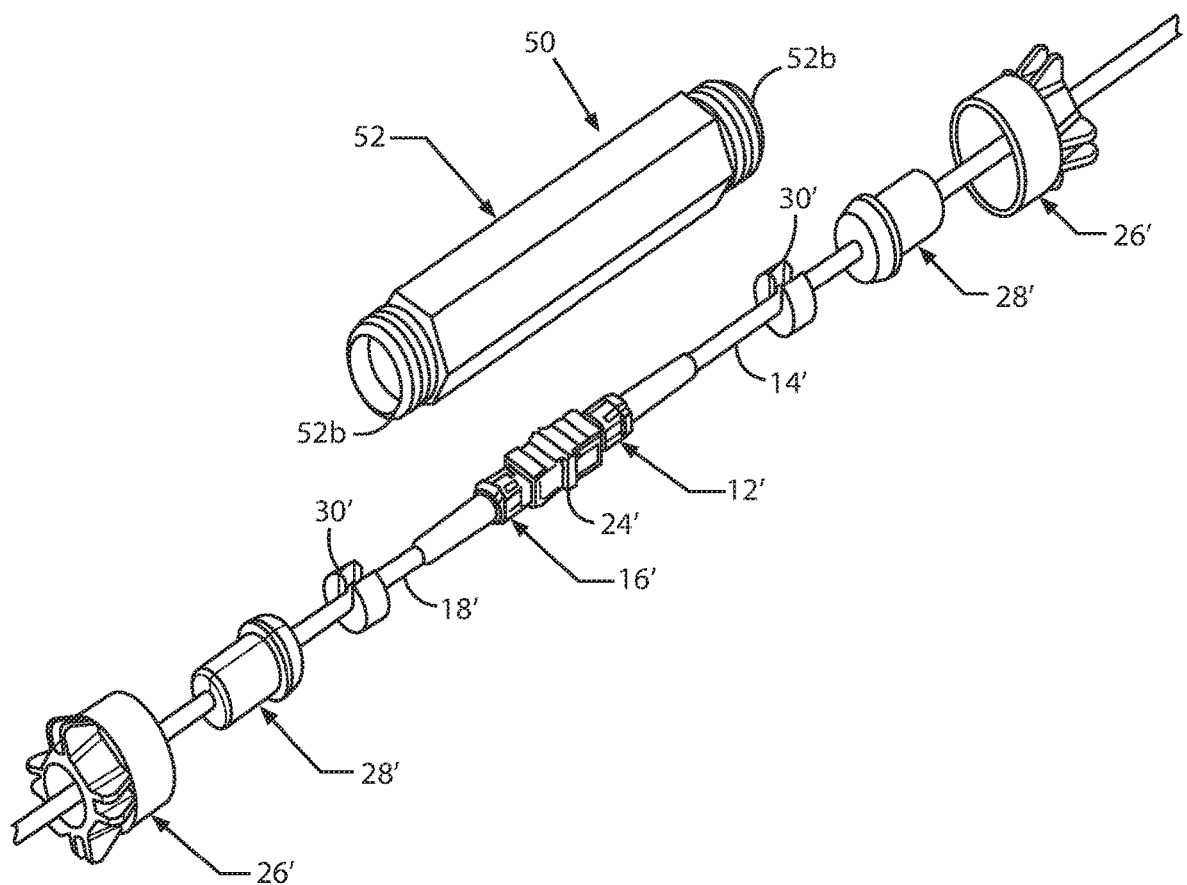
FIG. 4 is an exploded view of an armored connection between two fiber optic cables, according to the invention.

Also, as shown in FIG. 2, the port 22 is sized and formed at the back of the terminal wall 20 to receive and retain a conventional SCA adapter 24, shown more clearly in FIG. 4. Thus, the connector 12 on the drop cable 14 can connect to the end of the adapter 24 exposed at the front of the terminal wall 20, and the connector 16 on cable 18 can connect to the end of the adapter 24 exposed at the back of the wall 20.

Figure 10:
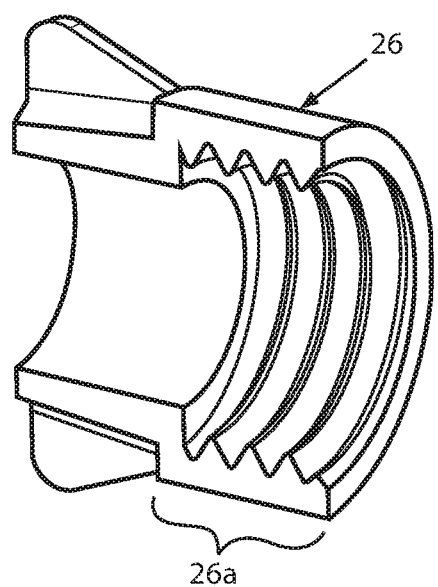
FIG. 10 is an isometric axial cross sectional view of a cap used in the connections of FIGS. 1 and 5.

As seen in FIG. 1, the inventive connecter assembly 10 includes the SCA adapter 24, a cylindrical cap 26 having an axial bore, a unitary cable grommet/boot 28 having an axial through passage for the drop cable 14, a rigid cable grip 30 also having an axial through passage for the cable 14, an elongated spacer 32 having an axial bore, and an O ring seal 34. An axial cross section of the cap 26 is shown in FIG. 10. The cap 26 is made of, e.g., polypropylene, and measures approximately 1.00 inch in length with an O.D. of about 1.00 inch.

Figure 8:
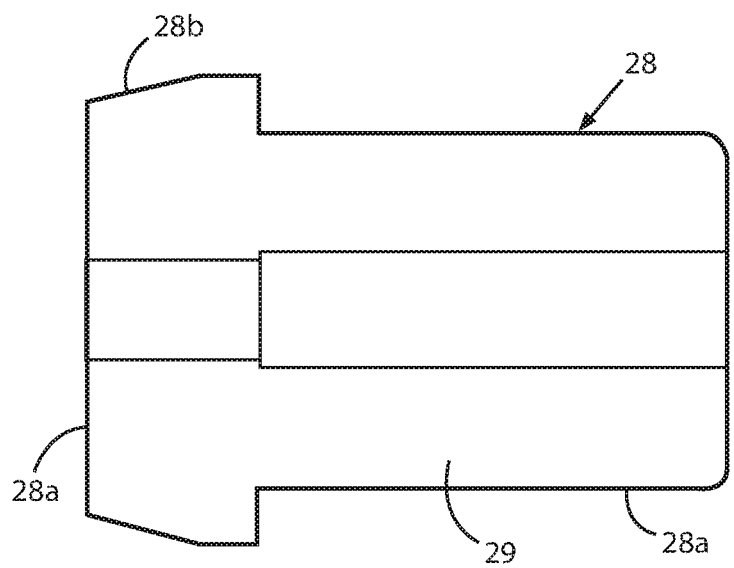
FIG. 8 is an axial cross sectional view of an integral cable grommet and boot used in the connections in FIGS. 1 and 5.
Figure 9:
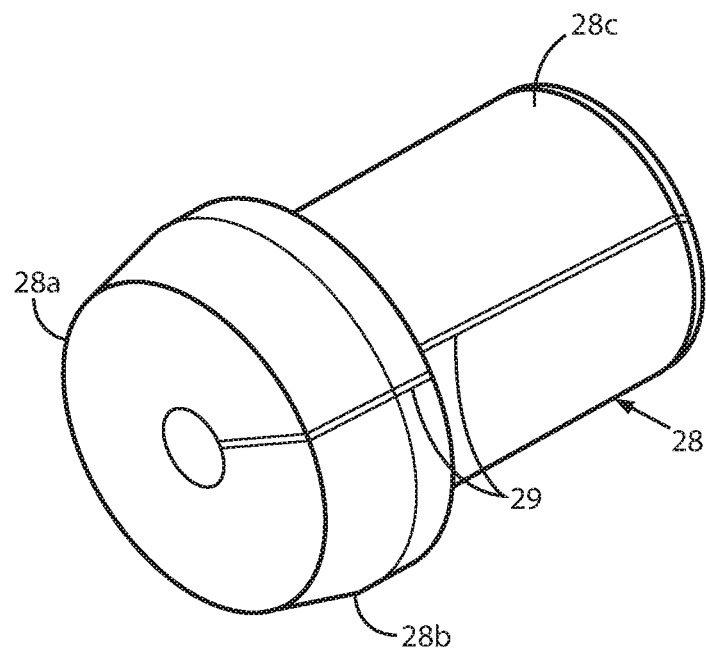
FIG. 9 is an isometric view of the cable grommet and boot in FIG. 8 as seen from a leading end.

The cable grommet/boot 28 is also shown in axial cross section in FIG. 8, and as viewed from a leading end face 28a in FIG. 9. The grommet/boot 28 is made of, e.g., polyurethane, and is approximately 1.112 inches long with a maximum O.D. of about 0.82 inch. The cable grip 30 is made of polycarbonate, and measures approximately 0.32 inch long with an O.D. of about 0.81 inch.

The grommet/boot 28 has an axially directed slit 29, and cable grip 30 has an axially directed opening 31, through which the cable 14 can be urged sideways and inserted for sliding movement inside the passages through the grommet/boot 28 and the cable grip 30.

Figure 7:
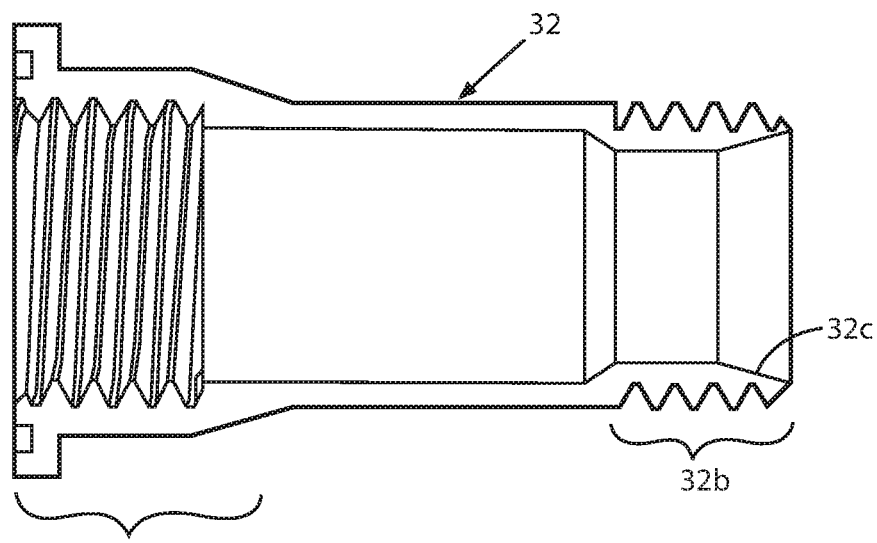
FIG. 7 is an axial cross sectional view of a spacer used in the connection of FIG. 1.

The spacer 32 is shown in axial cross section in FIG. 7. Spacer 32 is made of, for example, polypropylene and measures approximately 2.5 inches in length. As shown in FIG. 7, the inner circumference of a leading portion 32a of the spacer 32 is threaded to engage corresponding threads formed on the outer circumference of the collar 23 at the terminal wall port 22, after the O ring seal 34 is fitted over the collar 23. The outer circumference of a rear portion 32b of the spacer 32 is threaded for engaging corresponding threads that are formed on the inner circumference of a leading portion 26a of the cap 26, as shown in FIG. 10.

The connecter assembly 10 is constructed as follows. The cable 14 is first inserted through the bore in the cap 26, and then through the axial passages in the grommet/boot 28 and the cable grip 30 as explained above, with the cable grip 30 closer to the connector 12 and in contact with the leading end 28a of the grommet/boot 28. The connector 12 at the end of the cable 14 is inserted through the bore in the spacer 32 from the rear until the connector extends a certain distance ahead of the leading portion 32a of the spacer. The O ring seal 34 is set in place on the collar 23 of the terminal wall port 22, and the connector 12 at the end of the cable 14 is mated to the end of the adapter 24 exposed at the port. The leading portion 32a of the spacer 32 is then threaded and tightened onto the port collar 23.

Next, the cable grip 30 and the grommet/boot 28 are slid together along the cable 14 until the cable grip 30 is received in the opening of the bore at the rear portion 32b of the spacer 32. As shown in FIG. 7, the inner circumference of the rear portion 32b of the spacer is conically tapered outward at 32c, and the outer circumference on the leading end 28a of the grommet/boot has a matching inward conical taper at 28b which engages the taper on the rear portion 32b of the spacer 32. Thus, when the leading portion 26a of the cap 26 is threaded and tightened over the rear portion 32b of the spacer 32, the leading end 28a of the grommet/boot is compressed radially so that its axial slit 29 is closed and the cable 14 is sealed. (See FIG. 6).

As shown in FIG. 3, a rear portion 28c of the grommet/boot 28 is sized and dimensioned to protrude with minimal radial clearance from the opening at the rear end of the cap 26 when the cap is threaded onto the spacer 32. The rear portion 28c of the grommet/hood therefore serves as a boot to prevent the cable 14 from contacting or rubbing against the cap 26, and to ensure the cable does not bend below a specified minimum bend radius.

Figure 5:
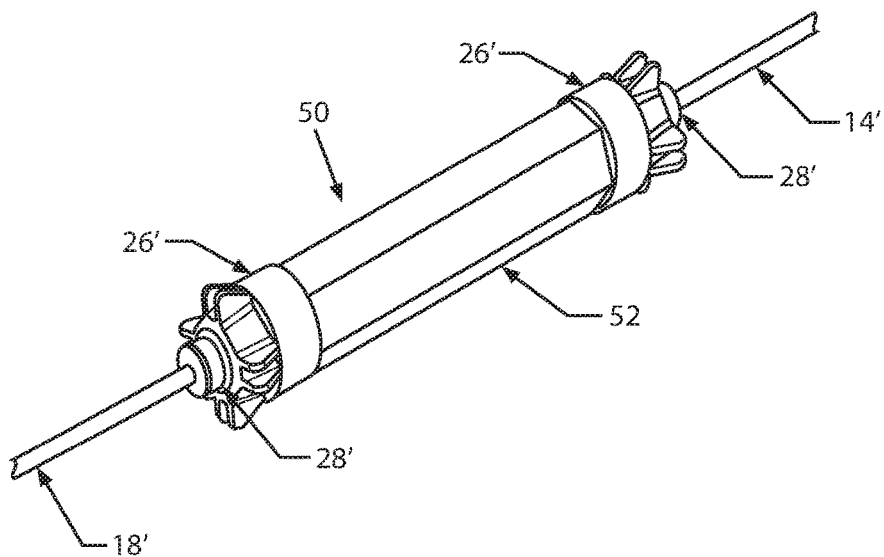
FIG. 5 is an isometric view of the armored connection in FIG. 4 in an assembled state.
Figure 6:
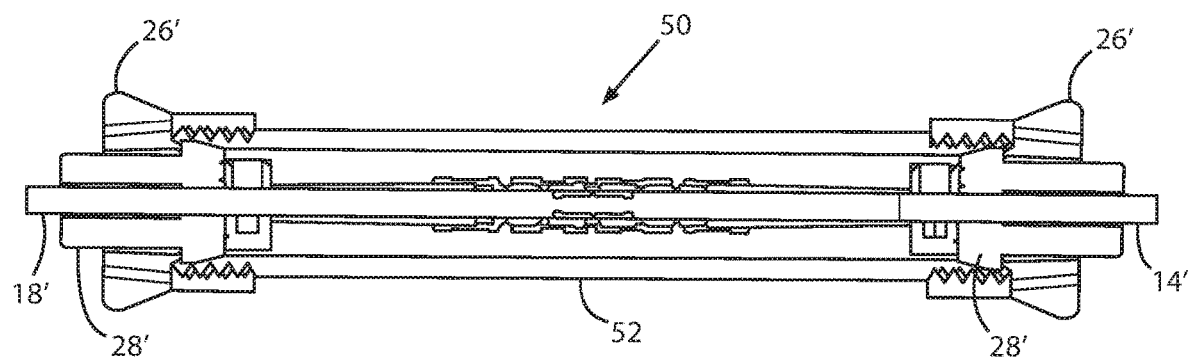
FIG. 6 is an axial cross sectional view of the assembled connection in FIG. 5.

FIG. 4 is an exploded view of a second embodiment of an armored fiber optic cable connector assembly 50, according to the invention. Components identical or similar to those in the connector assembly 10, are designated by the same reference numerals with an added prime ('). In the second embodiment, instead of connecting the cable 14 to a port of a fiber distribution terminal as in the first embodiment, two fiber optic cables 14', 18' are connected in line to one another via an SCA/SCA adapter 24'. When the connector assembly 50 is finished as shown in FIGS. 5 and 6, the assembly is capable of being buried underground outdoors.

In the connector assembly 50, an elongated housing 52 having a through bore replaces the function of the spacer 32 in the connection assembly 10 as a means for armoring or shielding a connection between the fiber optic cables 14', 18'. The single housing 52 protectively encloses both cable connectors 12', 16', the adapter 24', the cable grips 30', and the grommet/boots 28' when the caps 26' are threaded and tightened onto opposite axial end portions 52b of the housing 52.

To construct the connector assembly 50, each one of the connectors 12', 16' at the ends of the cables 14', 18 is inserted through the bore in a corresponding cap 26' from the back of the cap until the connector extends a certain distance ahead of the leading portion 26a of the cap. Each of the cables 14', 18' is inserted into the axial passages through the grommet/boot 28' and the cable grip 30' as explained above with respect to the first embodiment, with each cable grip 30' being closer to the corresponding connector 12', 16' and in contact with the leading end 28a' of the corresponding grommet/boot.

One of the two cables, e.g., cable 14', is inserted through the bore opening at one axial end of the housing 52, until the connector 12' at the end of the cable is accessible at the opposite end of the housing.

Connector 12' is mated to one end of the adapter 24', and the connector 16' at the end of cable 18' is mated to the opposite end of the adapter 24', thereby connecting the cables 14', 18' in line with one another. Cable 14' is then pulled in the direction toward the housing 52 until the adapter 24' with the mated connectors 12', 16' is approximately centered inside the housing.

The leading portions 26a' of the caps 26' are threaded and tightened over correspondingly threaded axial end portions 52b of the spacer 52, and the grommet/boots 28' are compressed radially so that their axial slits are closed and the cables 14', 18' are sealed within. As in the connector assembly 10, the rear portions 28c' of the grommet/hoods 28' act as boots to prevent the cables 14', 18' from contacting or rubbing against the caps 26.

While the foregoing describes and illustrates preferred embodiments of the present invention, it will be understood by persons of ordinary skill in the art that various changes, modifications, and additions can be made without departing from the spirit and scope of the invention.

For example, while the connector assembly 50 is described and illustrated herein with respect to a connection between round drop cables via an SCA adapter, the assembly can be modified to work with flat drop cables each containing two fibers. In such a modification, the connector assembly may include a splice holder with means for retaining sleeved fiber splices, and for accepting and anchoring associated cable sheaths in line with the retained splices.

Accordingly, the present invention includes all such changes, modifications, and additions that are within the scope of the following claims.

We claim:

1. An armored fiber optic cable connecter assembly, comprising:
   a terminal wall having a port constructed and arranged for connecting a first fiber optic cable at a front side of the wall, with a second fiber optic cable disposed at a back side of the wall;
   an elongated spacer having an axial through bore, a leading portion, and a rear portion;
   a connector adapter;
   the port on the terminal wall is sized and formed to retain the connector adapter so that a first end of the adapter is disposed on the front side of the wall for connection to the first fiber optic cable, and a second end of the adapter is disposed at the back side of the wall for connection to the second fiber optic cable;
   the leading portion of the spacer is dimensioned and configured to engage the port in sealing relationship at the front side of the wall;
   a generally cylindrical cap having an axial through bore that defines an opening in a back end of the cap, and a leading portion of the cap is dimensioned and configured to engage the rear portion of the spacer in alignment with the axial through bore in the spacer;
   a cable grommet/boot having a leading end, a rear portion, and an axial through passage dimensioned to receive the first fiber optic cable for relative sliding movement; and
   the leading end of the grommet/boot is dimensioned and formed to engage the rear portion of the spacer in sealing relationship, and the rear portion of grommet/boot is sized and dimensioned to protrude from the opening in the back end of the cap to act as a boot for the first fiber optic cable, when (i) the first fiber optic cable is passed through the opening in the back end of the cap, (ii) the cable is inserted in the passage in the grommet/boot and the rear portion of the grommet/boot together with the inserted cable is disposed within the bore in the cap, and (iii) the cap is engaged with the rear portion of the spacer after a leading end of the cable is connected to the first end of the adapter and the leading portion of the spacer is engaged with the port at the front side of the terminal wall;
   wherein the leading end of the cable and the port at the front side of the terminal wall are protectively enclosed or armored by the spacer and the cap.

2. A fiber optic cable connecter assembly according to claim 1, wherein the port includes a collar that extends from the front side of terminal wall.

3. A fiber optic cable connecter assembly according to claim 2, wherein the collar is threaded, and the leading portion of the spacer is threaded to engage corresponding threads on the collar.

4. A fiber optic cable connecter assembly according to claim 2, including an O ring seal dimensioned to fit over the collar.

5. A fiber optic cable connecter assembly according to claim 1, including a rigid cable grip having an axial through passage dimensioned to receive the first fiber optic cable.

6. A fiber optic cable connecter assembly according to claim 1, wherein the grommet/boot has an axially directed slit through which the first fiber optic cable can be urged sideways and inserted in the axial passage through the grommet/boot.

7. A fiber optic cable connecter assembly according to claim 5, wherein the cable grip has an axially directed slit through which the first fiber optic cable can be urged sideways and inserted in the axial passage through the cable grip.

8. An armored fiber optic cable connecter assembly for connecting first and second fiber optic cables to one another, comprising:
   an elongated housing having a through bore, and opposite axial end portions;
   a connector adapter;
   a pair of generally cylindrical caps each having an axial through bore that defines an opening in a back end of the cap, and a leading portion of each cap is dimensioned and configured to engage a corresponding axial end portion of the housing in alignment with the bore through the housing;
   a pair of cable grommet/boots each having a leading end, a rear portion, and an axial through passage dimensioned to receive a corresponding one of the first and the second fiber optic cables for relative sliding movement; and
   the leading end of each grommet/boot is dimensioned and formed to engage a corresponding axial end portion of the housing in sealing relationship, and the rear portion of each grommet/boot is sized and dimensioned to protrude from an opening in the back end of a corresponding cap to act as a boot for a corresponding one of the first and the second fiber optic cables, when (i) the first and the second fiber optic cables are passed through the openings in the back ends of corresponding caps, (ii) each cable is inserted in the passage in a corresponding grommet/boot and the rear portion of the grommet/boot together with the inserted cable is disposed within the bore in a corresponding cap, and (iii) each cap is engaged with a corresponding axial end portion of the housing after leading ends of the cables are connected to one another via the adapter;

wherein the leading ends of the cables and the adapter through which the cables are connected to one another, are protectively enclosed or armored by the housing and the caps.

9. A fiber optic cable connecter assembly according to claim 8, including a pair of rigid cable grips each having an axial through passage dimensioned to receive a corresponding one of the first and the second fiber optic cables for relative sliding movement.

10. A fiber optic cable connecter assembly according to claim 8, wherein each grommet/boot has an axially directed slit through which a corresponding one of the fiber optic cables can be urged sideways and inserted in the axial passage through the grommet/boot.

11. A fiber optic cable connecter assembly according to claim 9, wherein each cable grip has an axially directed slit through which a corresponding one of the fiber optic cables can be urged sideways and inserted in the axial passage through the cable grip.

* * * * *